Patented Apr. 4, 1944

2,345,659

UNITED STATES PATENT OFFICE 2,345,659

PROCESS FOR POLYMERIZING VINYL CHLORIDE

Alfred W. Downes, South Charleston, W. Va., assignor to Carbide and Carbon Chemicals Corporation, a corporation of New York No Drawing. Application February 15, 1941, Serial No. 379,041

6 Claims. (Cl. 260—88)

This invention relates to a process for polymerizing vinyl chloride whereby the relatively insoluble modification of the polymer may be obtained at a rapid rate of polymerization.

It is well known that vinyl chloride will polymerize to a vinyl resin under the influence of heat and many catalysts have been suggested to accelerate the rate of reaction. These catalysts include oxygenated compounds, such as ozone, hydrogen peroxide, dibenzoyl peroxide, diacetyl peroxide and barium peroxide; metal compounds which act as oxidizing agents in the presence of oxygen, such as uranium nitrate or lead salts; as well as non-oxygenated agents, such as lead tetraethyl. Actinic light is also effective to bring about polymerization. For the production of the insoluble modification of polyvinyl chloride, which has been classified in the chemical literature as "beta," "delta" or "gamma" polyvinyl chloride in accordance with its increasing insolubility and molecular weight, it is necessary to employ low temperatures of polymerization. This is because the molecular weight of a vinyl polymer has been found, in general, to be inversely proportional to the temperature of polymerization. At low temperatures, however, the rate of reaction is extremely slow; even on a small scale, two or three days being usually required to convert even half of the monomeric vinyl chloride charged to the insoluble grade of resin.

In accordance with this invention, it has been found that a high yield of polyvinyl chloride resin of the "beta," "delta" or "gamma" variety can be obtained in a few hours. The essence of this invention involves the discovery that hydrogen peroxide, which despite many suggestions for its use, has previously been found to be an indifferent catalyst for this reaction when employed in the amounts customary for other oxygenated catalysts, i. e. from 0.3 to 1.6% of the monomeric vinyl chloride charged, is an excellent catalyst for the polymerization of vinyl chloride when present in minute amounts. By this is meant that the concentration of hydrogen peroxide ($H_2O_2$) must be kept below 0.1% by weight of the vinyl chloride charged, preferably at a concentration below about 0.07% by weight of the vinyl chloride. Under these conditions, as much as 10 to 12% of the monomeric vinyl chloride in a batch can be polymerized per hour to insoluble polymers whereas previously, using other oxygenated catalysts, or hydrogen peroxide in the customary amounts, insoluble polyvinyl chloride was produced at rates of about 1% monomeric vinyl chloride polymerized per hour. The effect of traces of hydrogen peroxide in markedly accelerating the rate of polymerization is singular in that experience with other oxygenated catalysts has shown, in general, that the rate of polymerization decreases with decreasing amounts of catalyst.

The extreme sensitiveness of the rate of polymerization to the concentration of the hydrogen peroxide catalyst, within the critical ranges of this invention, has been demonstrated experimentally. The experiments were conducted by polymerizing at 40° C. vinyl chloride in a mixture containing, by weight, 96% vinyl chloride, 4.0% acetone, and varying amounts of hydrogen peroxide as a catalyst. The results of these experiments are tabulated below:

| Concentration of hydrogen peroxide, per cent | Time of polymerization (hours) | Conversion (per cent monomer polymerized) | Rate of polymerization (per cent monomer polymerized per hour) |
| --- | --- | --- | --- |
| 0.10 | 40.0 | 20.0 | 0.5 |
| 0.072 | 23.7 | 37.6 | 1.6 |
| 0.050 | 2.95 | 26.3 | 8.9 |
| 0.025 | 3.05 | 42.1 | 13.8 |

The rate of polymerization is that percentage of the vinyl chloride charged to the polymerization vessel which is polymerized per hour. In a batch process, this is an average rate determined by dividing the total percentage conversion of monomer to resin by the time of polymerization in hours. In a continuous process, the rate is the percentage of vinyl chloride monomer in the reaction vessel which is polymerized per hour.

In working with the minute amounts of hydrogen peroxide which are effective as a catalyst for the polymerization of vinyl chloride, certain precautions must be observed to prevent the decomposition of the peroxide. It is obvious that, if the catalyst is destroyed in this manner, the polymerization will be retarded because of the absence of any catalyst, and it may even be inhibited completely since the oxygen which is released by the decomposition of hydrogen peroxide is a polymerization inhibitor. It has been found that materials which are commonly used in the construction of polymerization autoclaves, such as iron, steel, stainless steel alloys, lead and aluminum, catalyze or promote the decomposition of hydrogen peroxide. Accordingly, if the polymerization is to be conducted with the reactants in contact with materials such as these, it is necessary that the hydrogen peroxide catalyst be replenished from time to time in order to compensate for the loss by decomposition. Since it is somewhat difficult to control the concentration of hydrogen peroxide in this manner, it is preferred to carry out the polymerization in the absence of materials which promote the decomposition of hydrogen peroxide. Inert materials which have been found to be acceptable from this standpoint are glass, enameled surfaces, platinum, glazed earthenware and various types of resinous linings, such as baked phenolic resin coatings. Materials which are considered unsatisfactory in their effect on the stability of hydrogen peroxide, other than those previously mentioned, are molybdenum, chromium, copper, gold, silver and various types of unglazed acid-proof brick, earthenware and cement.

The actual polymerization is preferably carried out by charging the monomeric vinyl chloride mixed with the proper amount of hydrogen peroxide, preferably in the form of an aqueous solution, to an autoclave kept under sufficient pressure to maintain the bulk of the vinyl chloride in the liquid state at the temperature of polymerization. For the production of relatively insoluble, highly polymerized polyvinyl chloride, temperatures below 60° C. are preferable. In order to secure a satisfactory dispersion of the hydrogen peroxide catalyst in the liquid monomeric vinyl chloride, it is highly desirable that a small amount of a mutual solvent be included in the charge. Satisfactory mutual solvents are those which are either water-soluble or appreciably miscible with water. In addition, the solvent must be sufficiently oxidized in its chemical nature so that the hydrogen peroxide, which is a strong oxidizing agent for organic matter, will not be dissipated by oxidation of the solvent. Suitable solvents which fulfill the requirements of water-solubility or miscibility and which are chemically inert to hydrogen peroxide are ketones, such as acetone, methyl ethyl ketone and acetonyl acetone; esters, such as methyl acetate and the acetate ester of diethylene glycol ethyl ether; and ethers, such as the diethyl ether of diethylene glycol, the dimethyl ether of tetraethylene glycol, and dioxane. The amount of solvent which is required is small and preferably no more is employed than is required to form a homogeneous solution of the aqueous hydrogen peroxide with the liquid monomeric vinyl chloride.

In some instances the use of a mutual solvent may be omitted and satisfactory dispersion of the aqueous hydrogen peroxide in the liquid monomeric chloride can be obtained by the addition of emulsifying agents to the peroxide solution.

In carrying out the polymerization, agitation is helpful in preventing agglomeration of the polymerized resin particles in large masses. The polymerization is usually carried to about 50% conversion in order to minimize the formation of the large masses referred to and, because of the high rate of polymerization, this degree of conversion is achieved in from four to six hours. At the end of this time the excess vinyl chloride and solvent is removed by stripping, and the polymeric vinyl chloride recovered as a white pulverulent material.

The rapid rate of polymerization effected by the use of small amounts of hydrogen peroxide as a catalyst is a great advantage in that it increases from six to ten times the productivity of a given piece of equipment. In addition, the increased rate makes a continuous process of polymerization feasible, whereas previous practical installations for this reaction have been limited to batch processes. In addition, the cost of the hydrogen peroxide is less than that of the organic peroxides and it is effective in much lower concentrations, so that additional economy is obtained. Another practical advantage of the method of this invention is that the residual hydrogen peroxide is readily removed from the finished product, whereas the organic peroxides are difficult to remove completely and residual amounts of these materials exert a detrimental effect on the stability of polyvinyl chloride to light and heat.

In addition, the process of this invention lends itself readily to exact control. Thus, the rate of polymerization and the molecular weight of the resin produced may be closely regulated by varying the amount of solvent employed, the concentration of the hydrogen peroxide catalyst and the temperature of polymerization. Other things being equal, the rate of polymerization is a direct function of the concentration of the monomeric chloride, that is to say an inverse function of the solvent concentration; a direct function of the polymerization temperature; and an inverse function of the concentration of hydrogen peroxide within the critical range of this invention. The molecular weight of the resin is, other things being constant, an inverse function of the amount of solvent present, an inverse function of the polymerization temperature and also an inverse function of the catalyst concentration within the range of this invention. The following examples illustrate in more detail the practice of the invention.

*Example 1.*—One hundred parts of vinyl chloride monomer, 4 parts of acetone and 0.09 part of aqueous 30% hydrogen peroxide (0.03% $H_2O_2$, based on vinyl chloride) were placed in a glass-lined bomb at 40° C. In a period of 5.2 hours, 59.0 parts of polyvinyl chloride resin separated from the acetone and unreacted monomer, the rate of polymerization being 11.3% monomeric vinyl chloride polymerized per hour. The resin was substantially insoluble in acetone and in most common organic solvents (except for a small fraction of lower polymers) and the specific viscosity of a 0.4% solution of the resin in nitrobenzene was 0.496, which indicates that the resin was of a high molecular weight. The specific viscosity is determined from the formula $$\lambda sp = \frac{a}{b} - 1$$

where $\lambda sp$ is the specific viscosity, $a$ is the time required for the resin solution to flow through a narrow orifice, and $b$ is the time required for the same amount of pure solvent to flow through the same orifice.

For comparison, the polymerization was carried out in the presence of an organic peroxide and to effect this, 100 parts of vinyl chloride monomer and 0.20 part of dibenzoyl peroxide were heated at 40° C. Fifty-three and four-tenth parts of polyvinyl chloride resin of an equivalent quality were obtained only after 49 hours of polymerization which corresponded to an average rate of polymerization of 1.1% monomer polymerized per hour.

*Example 2.*—One hundred parts of vinyl chloride, 3.8 parts of acetone and 0.10 part of aqueous 30% hydrogen peroxide were placed in a glass-lined bomb at a temperature of 40° C. Forty-seven and eight-tenth parts of polyvinyl chloride resin having a specific viscosity of 0.498 were obtained at an average rate of polymerization of 10.4% monomer polymerized per hour.

*Example 3.*—One hundred parts of vinyl chloride, 3.5 parts of acetone and 0.10 part of aqueous 30% hydrogen peroxide were placed in a pressure resistant glass vessel and polymerized at 40° C. in the presence of an exposed surface of platinum. The platinum was substantially without effect on the reaction; 39.8 parts of polyvinyl chloride having a specific viscosity of 0.465 were obtained at an average rate of polymerization of 9.3% monomer polymerized per hour.

*Example 4.*—One hundred parts of vinyl chloride, 3.4 parts of acetone and 0.1 part of aqueous 30% hydrogen peroxide were placed in a pressure resistant glass vessel and polymerized at 40° C. in the presence of an exposed surface of porcelain. The porcelain was without significant effect on the polymerization; 49.2 parts of high quality polyvinyl chloride having a specific viscosity of 0.477 were obtained at an average rate of polymerization of 11.1% monomer polymerized per hour.

*Example 5.*—One hundred parts of vinyl chloride, 1.3 parts of acetone and 0.057 part of aqueous 53% hydrogen peroxide (0.03% $H_2O_2$ based on the vinyl chloride) were placed in a glass-lined vessel and heated to 40° C. There resulted 40.5 parts of polyvinyl chloride having a specific viscosity of 0.457 and the average rate of polymerization was 9.0% monomer polymerized per hour.

This example shows that smaller amounts of solvent are required to insure homogeneity when more concentrated hydrogen peroxide solutions are employed.

*Example 6.*—One hundred parts of vinyl chloride, 4.4 parts of acetone, and 0.10 part of aqueous 30% hydrogen peroxide were placed in a pressure resistant glass vessel and polymerized at a temperature of 35° C. At the end of 3.3 hours, 16.6 parts of resin having a specific viscosity of 0.507 were obtained at an average rate of polymerization of 5.0% monomer polymerized per hour; the lower rate of polymerization and the higher viscosity of the resin produced, as compared to Examples 1 and 2, being attributed to the lower temperature of polymerization.

*Example 7.*—One hundred parts of vinyl chloride, 4.0 parts of acetone and 0.10 part of aqueous 30% hydrogen peroxide were placed in a glass-lined tube, closed at each end by glass sealed with a cork gasket material. The polymerization was carried out at 40° C. in the presence of an exposed surface of a baked phenolic resin. The resinous material, which is suitable as a lining for reaction vessels, was without appreciable effect on the polymerization; 26 parts of resin having a specific viscosity of 0.41 being obtained at an average rate of 7% monomer polymerized per hour.

Modifications of the invention other than as described will be readily apparent to those familiar with the art and are included within the invention as defined in the appended claims.

I claim:

1. Process for producing a vinyl resin at a rate of polymerization in excess of 1.6% vinyl monomer polymerized per hour which comprises polymerizing vinyl chloride while maintaining mixed therewith an effective catalytic amount of hydrogen peroxide less than about 0.07% by weight of the total vinyl chloride.

2. Process for making highly polymerized polyvinyl chloride at a rate of polymerization in excess of 1.6% vinyl chloride monomer polymerized per hour which comprises polymerizing vinyl chloride at a temperature below 60° C., while maintaining mixed therewith an effective catalytic amount of hydrogen peroxide less than about 0.07% by weight of the total vinyl chloride.

3. Process for making highly polymerized polyvinyl chloride at a rate of polymerization in excess of 1.6% vinyl chloride monomer polymerized per hour which comprises polymerizing monomeric vinyl chloride at a temperature below 60° C. in a mixture in which is maintained a small effective amount of aqueous hydrogen peroxide, the hydrogen peroxide concentration being less than about 0.07% by weight of the total vinyl chloride, and an inert mutual solvent for the aqueous hydrogen peroxide and monomeric vinyl chloride.

4. Process for making highly polymerized polyvinyl chloride at a rate of polymerization in excess of 5.0% vinyl chloride monomer polymerized per hour which comprises polymerizing vinyl chloride at a temperature below 60° C. in the presence of an effective catalytic amount of hydrogen peroxide less than about 0.05% by weight of the vinyl chloride, the polymerization being carried out in a vessel the inner surface of which is inert to hydrogen peroxide.

5. Process for making highly polymerized polyvinyl chloride at a rate of polymerization in excess of 1.6% vinyl chloride polymerized per hour which comprises polymerizing vinyl chloride at a temperature below 60° C. in the presence of a small effective amount of hydrogen peroxide as a catalyst, the polymerization being conducted in a vessel the inner surface of which is not inert to hydrogen peroxide and the concentration of hydrogen peroxide being maintained at a value not exceeding about 0.07% by weight of the total vinyl chloride by the addition of fresh hydrogen peroxide.

6. Process for making highly polymerized polyvinyl chloride at a rate in excess of 5.0% vinyl chloride monomer polymerized per hour which comprises polymerizing vinyl chloride at a temperature below 60° C. in the presence of a small amount of acetone and an effective catalytic amount of hydrogen peroxide less than about 0.05% by weight of the vinyl chloride, the polymerization being carried out in a vessel the inner surface of which is glass.

ALFRED W. DOWNES.